United States Patent [19]

LaValle

[11] Patent Number: 5,829,813
[45] Date of Patent: Nov. 3, 1998

[54] RETRACTABLE TRUCK TOPPER STORAGE UNITS

[76] Inventor: Lawrence R. LaValle, 494—97th La. Northeast, Blaine, Minn. 55434

[21] Appl. No.: 798,719

[22] Filed: Feb. 12, 1997

[51] Int. Cl.[6] ....................................................... B60R 7/02
[52] U.S. Cl. .......................... 296/376; 296/37.7; 224/311
[58] Field of Search .................................. 296/37.6, 37.7, 296/164; 224/311

[56] References Cited

U.S. PATENT DOCUMENTS

| | | | |
|---|---|---|---|
| 2,236,428 | 3/1941 | Haas | 296/37.7 |
| 3,473,680 | 10/1969 | Downer | 224/311 |
| 3,534,892 | 10/1970 | Truelove | 244/311 |
| 4,180,299 | 12/1979 | Tolerson | 224/311 |
| 4,424,907 | 1/1984 | Robb | 224/311 |
| 5,310,237 | 5/1994 | McCloy, II et al. | |
| 5,372,289 | 12/1994 | Dachicourt | 296/37.7 |
| 5,407,261 | 4/1995 | Mercer | |
| 5,597,103 | 1/1997 | Nichols | 224/311 |

Primary Examiner—Gary C. Hoge
Attorney, Agent, or Firm—Mackall, Crounse & Moore, PLC

[57] ABSTRACT

A standard truck topper to which the present invention may be attached is generally designated in the Figures by reference numeral 10. The truck topper 10 consists of a front end 12, rear end 14, roof 16, and sidewalls 18. An openable door 20 is generally provided at the rear end 14 of the topper. Such a standard topper is adapted for placement on the bed 24 of a standard pickup truck.

10 Claims, 6 Drawing Sheets

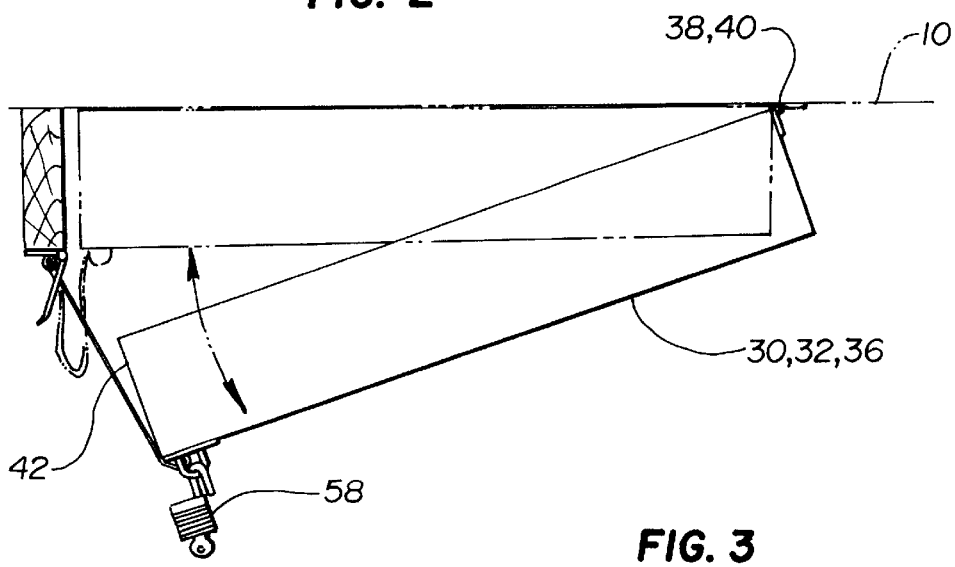
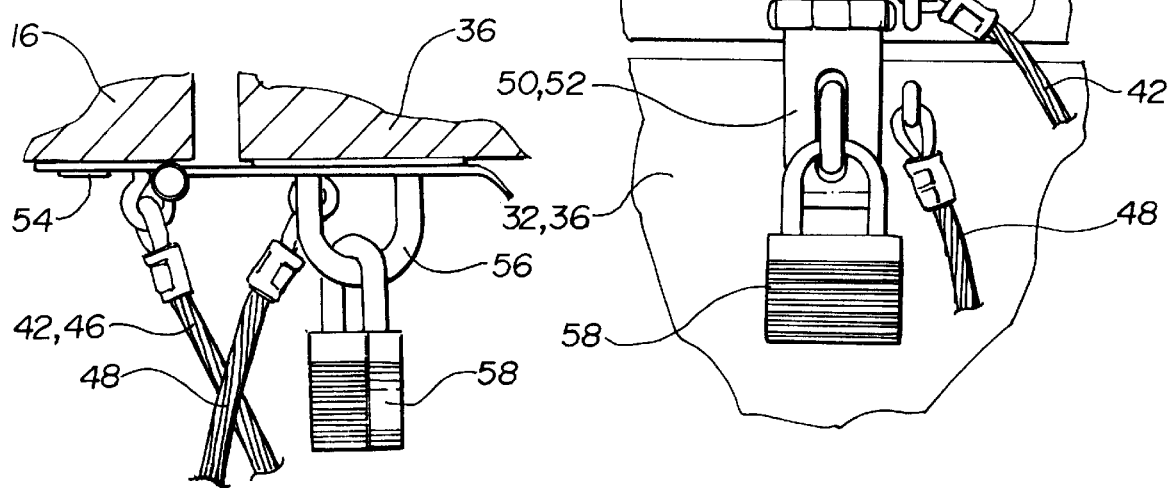

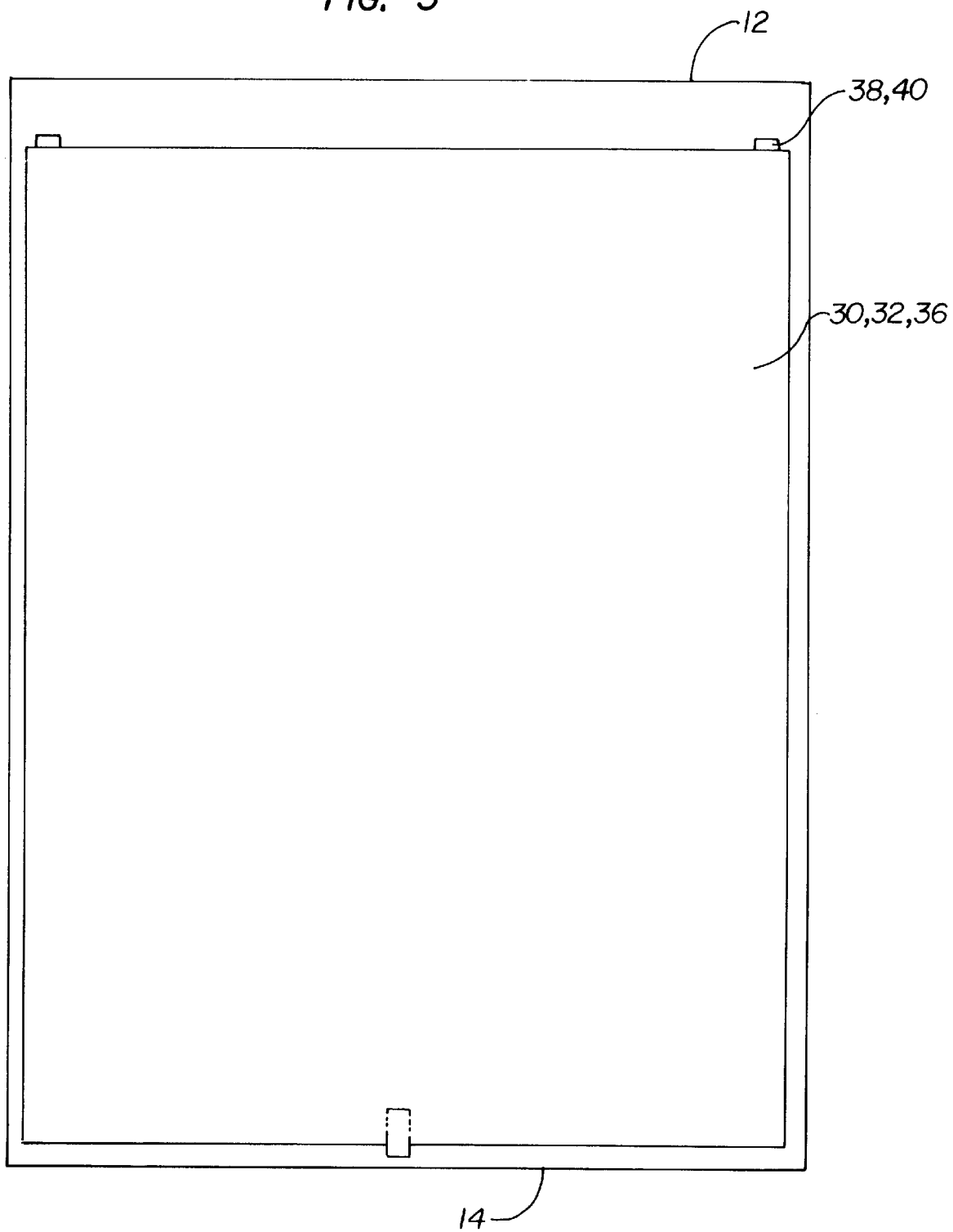

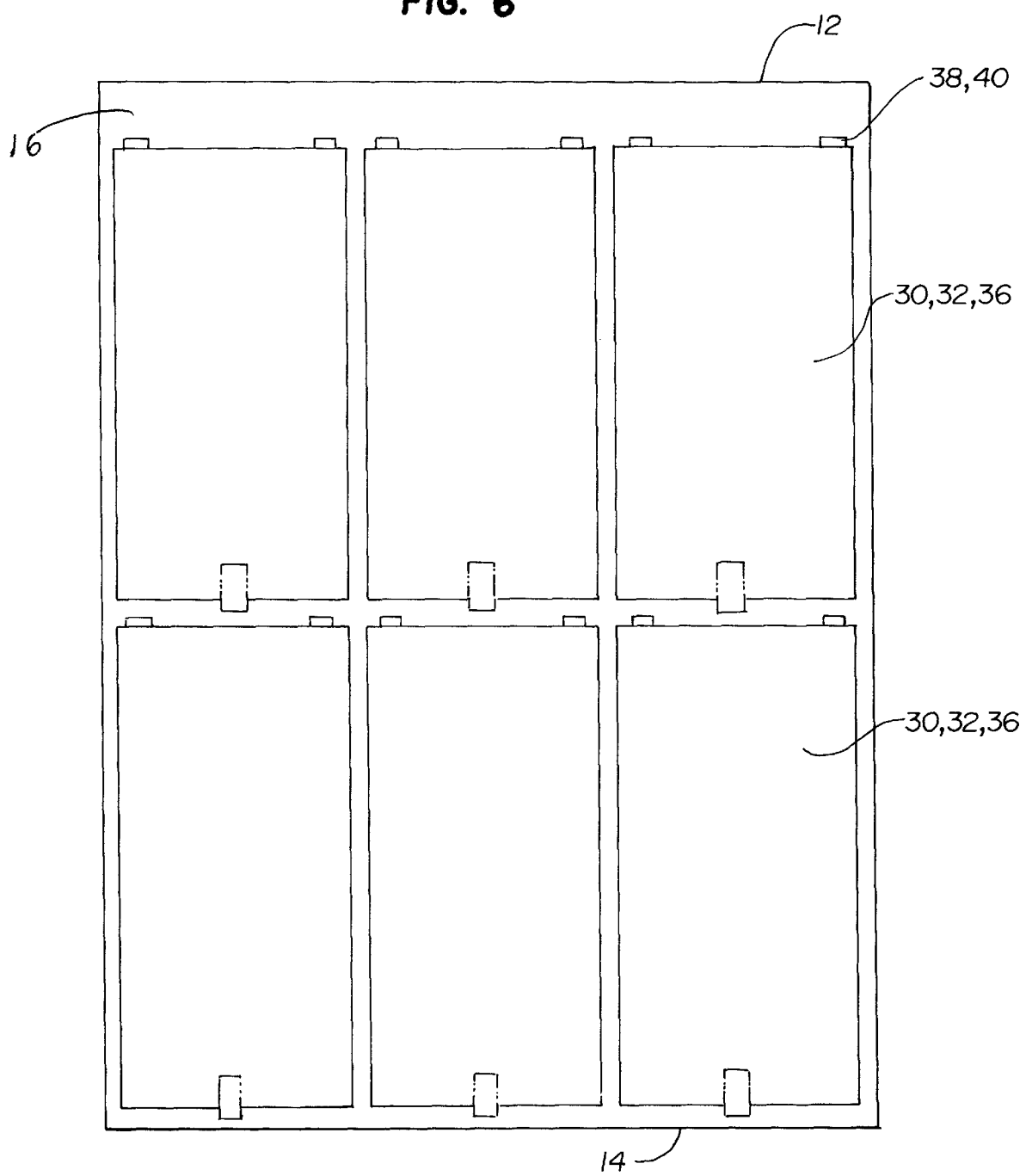

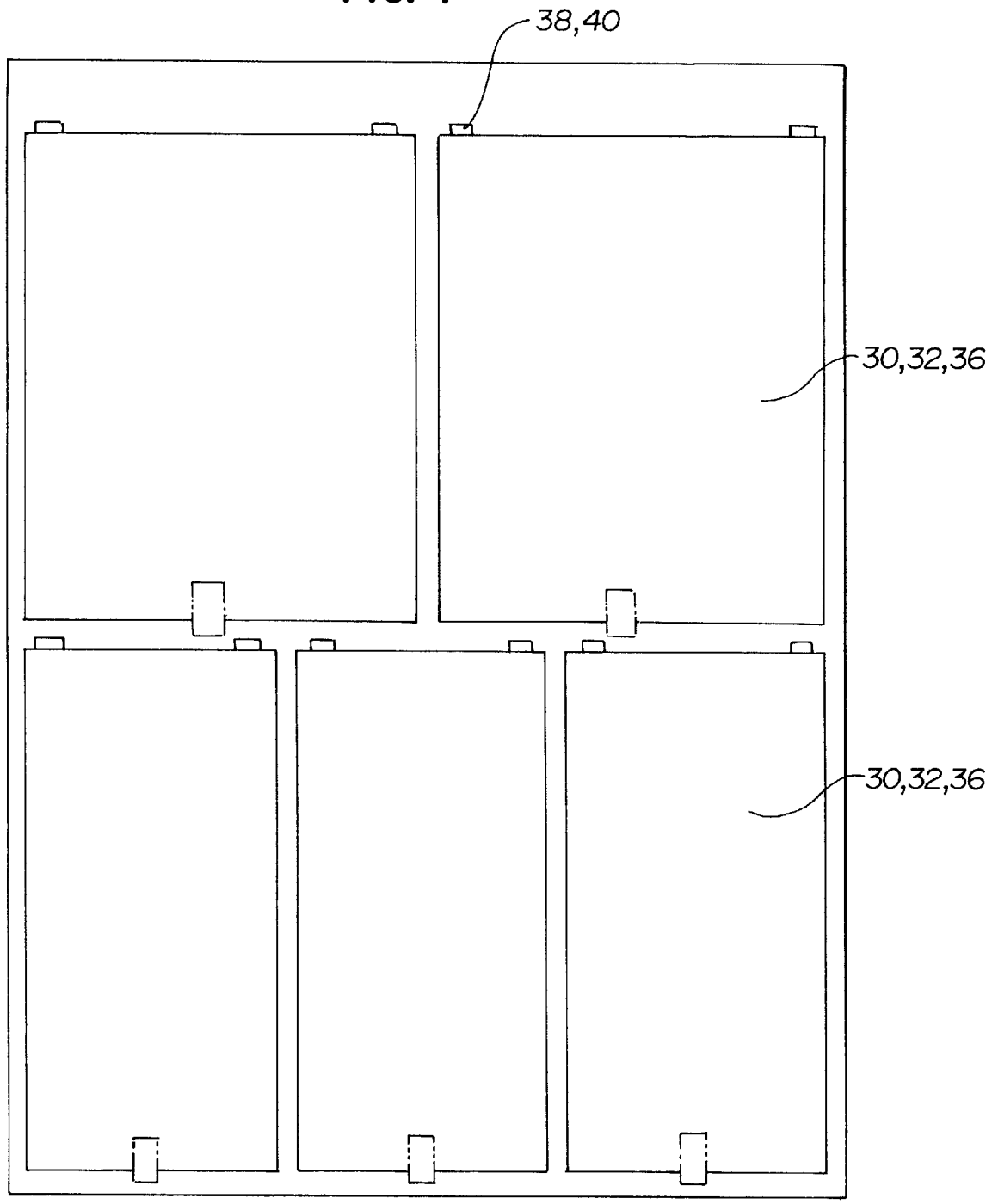

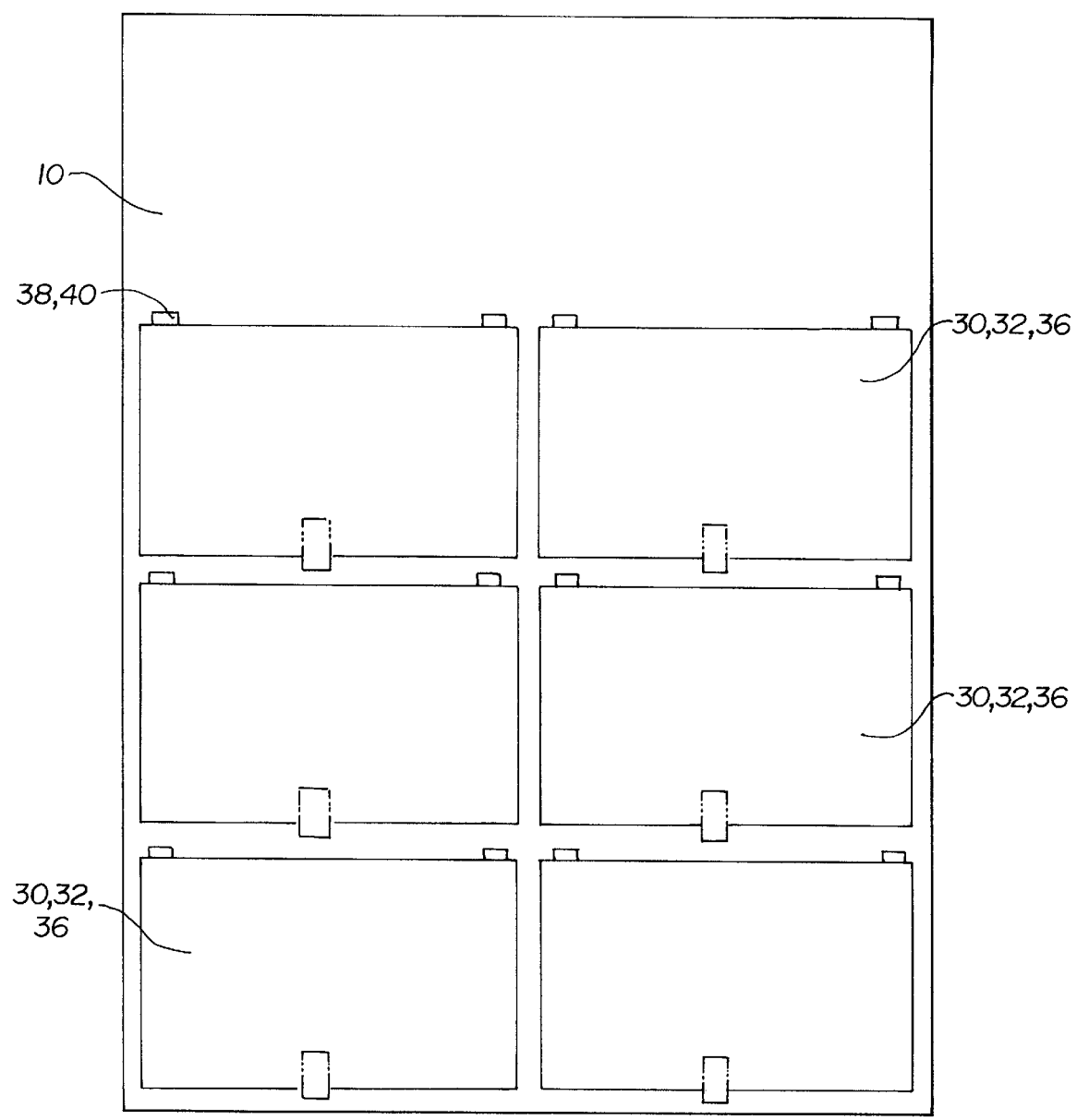

5,829,813

RETRACTABLE TRUCK TOPPER STORAGE UNITS

BACKGROUND OF THE INVENTION

The present invention relates to retractable storage units for truck toppers.

Truck toppers are devices which are adapted for placement on the bed of a standard pickup truck to thereby enclose the pickup truck bed. A standard truck topper, as shown in the Figures, has a front end, a rear end, a roof, and sidewalls. Usually, a door is placed in the rear end of the truck topper to allow access to the contents of the pickup bed.

Truck toppers have the general problem of storing articles placed within the topper. Articles may be placed on the floor of the pickup bed, but in that case the articles are free to move around, bang against each other, and potentially become lost.

Alternatively, storage units may be built into the truck topper for storing articles. However, there is a limited amount of space between the truck topper and the pickup bed. Such space is quite valuable because of its scarcity, there generally being little clearance between the roof of the truck topper and the bed of the pickup truck. Storage units which continuously project into this space have little use for this reason.

Accordingly, there is a need for a retractable storage unit for attachment to a standard truck topper to solve the above-mentioned problems.

SUMMARY OF THE INVENTION

A retractable storage unit for attachment to a standard truck topper, the truck topper having a front end, a rear end, a roof, and sidewalls, the truck topper being adapted for placement on the bed of a standard pickup truck and thereby enclosing the pickup truck bed, the retractable storage unit comprising a drawer adapted to hold articles to be stored, the drawer having a number of storage compartments, a hinge attached to the drawer and to the truck topper and adapted to allow the retraction of the drawer against the truck topper and to allow the drawer to open away from the truck topper, and a support attached to the truck topper and the drawer and adapted to hold the drawer in an open position away from the truck topper. Optionally, a lock may be included to lock the retractable storage unit in a closed position and thereby make the contents of the retractable storage unit inaccessible.

A principal object and advantage of the present invention is that the storage units are retractable and do not project into the space between the truck topper and the truck bed when the storage units are retracted.

Another object and advantage of the present invention is that multiple retractable storage units may be added to a standard truck topper.

Another object and advantage of the present invention is that the retractable storage units may be deeper near the front of the topper and shallower near the rear of the topper, in order not to interfere with accessing the truck bed from the rear.

Another object and advantage of the present invention is that several retractable storage units may be positioned along the length of the truck topper.

Another object and advantage of the present invention is that several retractable storage units may be positioned along the width of the truck topper.

Another object and advantage of the present invention is that the retractable storage units may be locked in the retracted position in order to prevent unauthorized access.

A feature of the present invention is that the retractable storage units may be attached to the roof of the truck topper and extend downwardly.

BRIEF DESCRIPTION OF THE DRAWINGS

FIG. 2 is a side elevational view of a retractable storage unit of the present invention, showing the unit in the extended position and in the retracted position.

FIG. 3 is a partial bottom view of the a retractable storage unit of the present invention in the retracted position, showing the lock.

FIG. 4 is a partial side view of the a retractable storage unit of the present invention in the retracted position, showing the lock.

FIG. 5 is a schematic of the retractable storage unit of the present invention attached to a truck topper.

FIG. 6 is a schematic of another arrangement of the retractable storage units of the present invention.

FIG. 7 is a schematic of another arrangement of the retractable storage units of the present invention.

FIG. 8 is a schematic of another arrangement of the retractable storage units of the present invention.

DETAILED DESCRIPTION OF THE PREFERRED EMBODIMENTS

Figure 1:
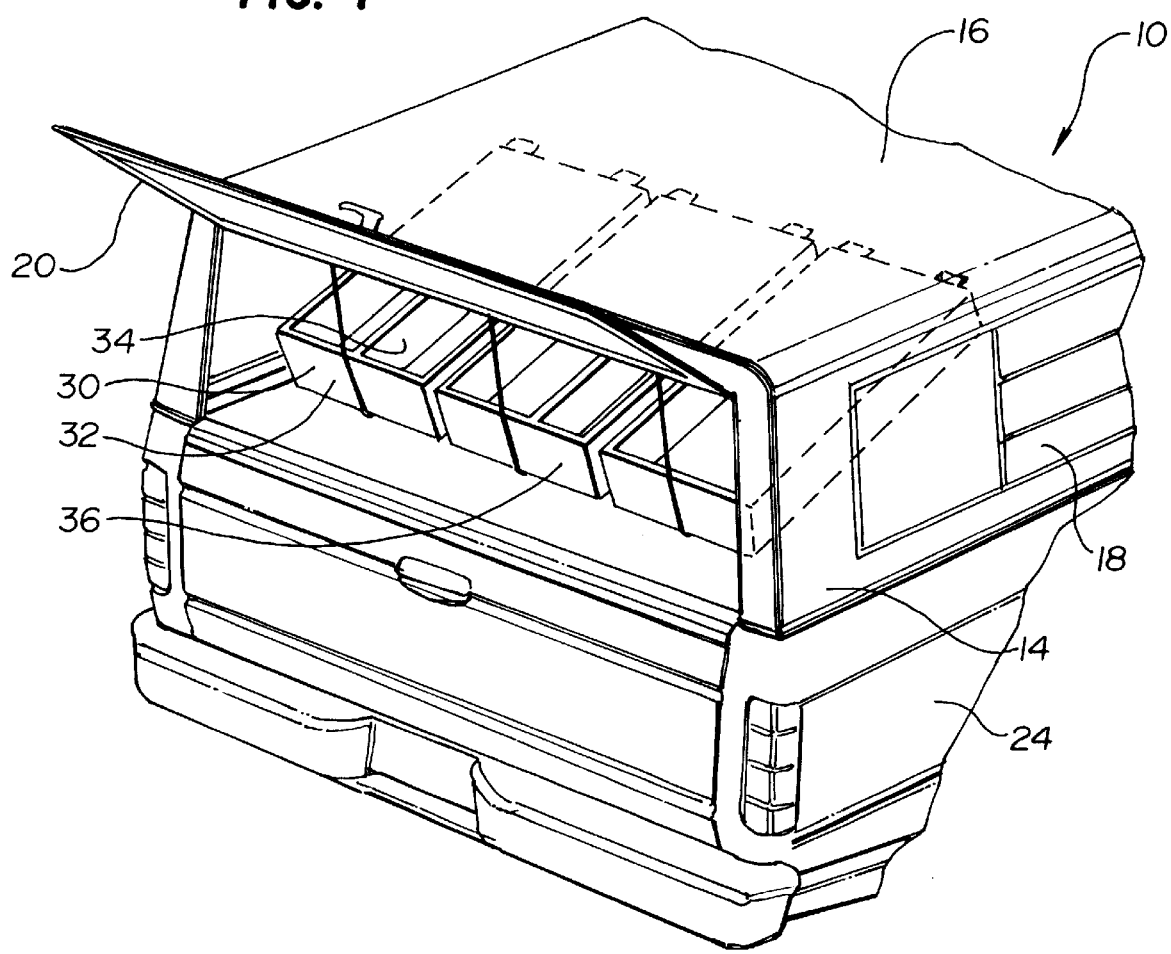
FIG. 1 is a perspective view of the retractable storage units of the present invention positioned on a standard pickup truck topper.

A standard truck topper to which the present invention may be attached is generally designated in the Figures by reference numeral 10. The truck topper 10 consists of a front end 12, rear end 14, roof 16, and sidewalls 18. An openable door 20 is generally provided at the rear end 14 of the topper. Such a standard topper is adapted for placement on the bed 24 of a standard pickup truck.

A retractable storage unit of the present invention is generally designated in the Figures as reference numeral 30.

The retractable storage unit 30 comprises a storage means 32 for holding articles to be stored. The storage means 32 may preferably have a number of storage compartments 34.

In the preferred embodiment, the storage means 32 is a drawer 36. Other storage means such as a box or shelf would also be possible.

The retractable storage unit 30 also comprises a hinge means 38 attached to the storage means 32 and to the truck topper 10 for allowing the retraction of the storage means 32 against the truck topper 10 and for allowing the storage means 32 to open away from the truck topper 10, as shown in FIG. 2. In the preferred embodiment, the hinge means 38 is a hinge 40.

Preferably, the hinge 40 is attached to the roof 16 of the topper 10 and the storage means 32 opens downwardly as shown in FIG. 2. Alternatively, the hinge 40 could be attached to the sidewall 18 and the storage means 32 would open inwardly (not shown).

The retractable storage unit 30 also comprises a support 42 attached to the topper 10 and the storage means 32 or drawer 36 and adapted to support the storage means 32 or drawer 36 in an open position away from the topper 10. The support 42 may comprise a rope, cable, strut or other equivalent. In the preferred embodiment, the support 42 is a cable 44 having a first end 46 and a second end 48, the first end 46 being attached to the roof 16 and the second end 48 being attached to the storage means 32 or drawer 36, the storage means 32 or drawer 36 opening downwardly and the cable 44 preventing overextension of the storage means 32 or drawer 36.

The retractable storage unit 30 may also comprise a keyed lock means 50 for locking the storage means 32 in a retracted position against the truck topper 10, whereby the contents of the storage means 32 is inaccessible without a key matching the security lock. In the preferred embodiment, the keyed security lock means 50 further comprises a hasp 52 having a first portion 54 attached to the roof 16 and a second portion 56 attached to the drawer 36, the first portion 54 mating with the second portion 56, and a padlock 58 locking the first portion 54 to the second portion 56.

In one embodiment, shown in FIG. 5, the length of the storage means 32 or drawer 36 is substantially the same as the length of the truck topper 10 between the front end 12 and the rear end 14. This give a large retractable storage unit 30 running the length of the topper.

In a second embodiment, shown in FIG. 6, the length of the storage means 32 or drawer 36 is less than the length of the truck topper 10 between the front end 12 and the rear end 14 and multiple storage units 30 are attached to the roof 16 between the front end 12 and the rear end 14.

In the second embodiment, it is preferable that the depth of the storage unit 30 positioned adjacent the rear end 14 is approximately four inches and the length of the storage means 32 or drawer 36 positioned adjacent the rear end 14 is less than about one-half the length of the topper 10 between the front end 12 and the rear end 14. The unit 30 adjacent the rear end 14 preferably does not have a depth greater than four inches to avoid interfering with access to the truck bed 24 from the rear door 20. In the second embodiment, the storage unit 30 positioned adjacent the front end 12 may have a depth of approximately six inches and a length less than about one-half the length of the topper 10 between the front end 12 and the rear end 14. The unit 30 adjacent the front end 12 may be deeper than the unit 30 adjacent the rear end 14 because the likelihood of interfering with access to the truck bed 24 from the rear door 20 is less.

In a third embodiment, also shown in FIG. 6, the width of the storage means 32 or drawer 36 is less than the width of the truck topper 10 between the sidewalls 18, and multiple retractable storage units 30 are attached across the width of the truck topper 10 between the sidewalls 18. In this embodiment, the width of the storage means 32 or drawer 36 may be less than about one-half of the width of the truck topper between the sidewalls 18, and two retractable storage units 30 are attached to the truck topper 10 between the sidewalls 18. Alternatively, also as shown in FIG. 7, the width of the storage means 32 or drawer 36 may be less than about one-third of the width of the truck topper 10 between the sidewalls 18, and three retractable storage units 30 may be attached to the truck topper 10 between the sidewalls 18.

The above embodiments may also be combined, as shown in FIG. 6, FIG. 7, and FIG. 8, so that multiple retractable storage units 30 may be attached across the length and width of the truck topper 10.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A retractable storage unit for attachment to a standard truck topper, the truck topper having a front end, a rear end, a roof, and sidewalls, the truck topper being adapted for placement on the bed of a standard pickup truck and thereby enclosing the pickup truck bed, the retractable storage unit comprising:

a drawer adapted to hold articles to be stored, the drawer having a number of storage compartments, a hinge attached to the drawer and to the truck topper and adapted to allow the retraction of the drawer against the truck topper and to allow the drawer to open away from the truck topper, a support attached to the truck topper and the drawer and adapted to support the drawer in an open position away from the truck topper, and a keyed security lock means for locking the drawer in a retracted position against the truck topper, whereby the contents of the drawer are inaccessible without a key matching the security lock, wherein the keyed security lock means further comprises a hasp having a first portion attached to the roof and a second portion attached to the drawer the first portion mating with the second portion, and a padlock locking the first portion to the second portion.

2. The retractable storage unit of claim 1, wherein the support further comprises a cable having a first end and a second end, the first end being attached to the roof and the second end being attached to the drawer, the drawer opening downwardly and the cable preventing overextension of the drawer.

3. The retractable storage unit of claim 1, wherein the length of the drawer is substantially the same as the length of the truck topper between the front end and the rear end.

4. The retractable storage unit of claim 1, wherein the length of the drawer is less than the length of the truck topper between the front end and the rear end, and multiple storage units are attached to the roof between the front end and the rear end.

5. The retractable storage unit of claim 4, wherein the depth of the drawer is approximately four inches, the length of the drawer is less than about one-half the length of the truck topper between the front end and the rear end, and the retractable storage unit is positioned adjacent the rear end.

6. The retractable storage unit of claim 4, wherein the depth of the drawer is approximately six inches, the length of the drawer is less than about one-half the length of the truck topper between the front end and the rear end, and the retractable storage unit is positioned adjacent the front end.

7. The retractable storage unit of claim 1, wherein the width of the drawer is less than the width of the truck topper between the side walls, and wherein multiple retractable storage units are attached across the width of the truck topper between the side walls.

8. The retractable storage unit of claim 7, wherein the width of the drawer is less than about one-half of the width of the truck topper between the side walls, and two retractable storage units are attached to the truck topper between the side walls.

9. The retractable storage unit of claim 7, wherein the width of the drawer is less than about one-third of the width of the truck topper between the side walls, and three retractable storage units are attached to the truck topper between the side walls.

10. A retractable storage unit for attachment to a standard truck topper, the truck topper having a front end, a rear end, a roof, and sidewalls, the truck topper being adapted for placement on the bed of a standard pickup truck and thereby enclosing the pickup truck bed, the retractable storage unit comprising:

a drawer adapted to hold articles to be stored, the drawer having a number of storage compartments, a hinge attached to the drawer and to the truck topper and adapted to allow the retraction of the drawer against the truck topper and to allow the drawer to open away from the truck topper, a support attached to the truck topper and the drawer and adapted to support the drawer in an open position away from the truck topper, and a hasp having a first portion attached to the truck topper and a second portion attached the drawer, the first portion mating with the second portion, and a padlock locking the first portion to the second portion wherein the support further comprises a cable having a first end and a second end, the first end being attached to the truck topper and the second end being attached to the drawer, the drawer opening downwardly and the cable preventing overextension of the drawer.

\* \* \* \* \*